United States Patent [19]

Yamamoto et al.

[11] 4,126,716

[45] Nov. 21, 1978

[54] PROCESS FOR PREPARING STABLE ANHYDROUS SODIUM DITHIONITE

[75] Inventors: Kousuke Yamamoto; Shinji Takenaka, both of Ohmuta, Japan

[73] Assignee: Mitsui Toatsu Chemicals, Inc., Tokyo, Japan

[21] Appl. No.: 750,814

[22] Filed: Dec. 15, 1976

[30] Foreign Application Priority Data

Jan. 6, 1976 [JP] Japan .................................... 51-68

[51] Int. Cl.² ............................................ C01B 17/66
[52] U.S. Cl. .................................. 427/215; 423/515; 423/265; 423/267
[58] Field of Search ............... 423/515, 265, 267, 242; 252/188; 427/215

[56] References Cited

U.S. PATENT DOCUMENTS

| | | | |
|---|---|---|---|
| 2,913,310 | 11/1959 | Sandborn et al. | 413/422 |
| 3,677,699 | 7/1972 | Fujiwara et al. | 423/515 |
| 3,804,944 | 4/1974 | Kise et al. | 423/515 X |
| 3,887,695 | 6/1975 | Plentovich et al. | 423/515 |
| 4,017,593 | 4/1977 | Voelki et al. | 423/515 |

FOREIGN PATENT DOCUMENTS

| | | | |
|---|---|---|---|
| 2,052,522 | 5/1971 | Fed. Rep. of Germany | 423/515 |
| 2,620,096 | 12/1976 | Fed. Rep. of Germany | 423/515 |
| 23,515 of | 1905 | United Kingdom | 423/515 |

*Primary Examiner*—Jack Cooper
*Attorney, Agent, or Firm*—Sherman & Shalloway

[57] ABSTRACT

A process for preparing stable anhydrous sodium dithionite which comprises reacting formic acid or sodium formate, sodium hydroxide, and sulfurous acid anhydride in hydrous methanol, wherein an aqueous solution of sodium carbonate or sodium hydroxide is added to the slurry after the reaction, and stabilized anhydrous sodium dithionite is separated from the slurry.

6 Claims, No Drawings

PROCESS FOR PREPARING STABLE ANHYDROUS SODIUM DITHIONITE

This invention relates to a process for preparing stable anhydrous sodium dithionite (to be referred to as hydrosulfite).

Hydrosulfite is unstable in an acidic condition, and decomposes by moisture or oxygen in air during storage to generate an acidic substance which further increases the decomposability of hydrosulfite. Hence, commercially available hydrosulfite products contain about 5% by weight of sodium carbonate as a stabilizer. This stabilization has previously been performed by mixing powdery sodium carbonate with dried hydrosulfite. However, with such a method, it is difficult to mix a small amount of sodium carbonate uniformly by a continuous operation. In addition, since the product obtained by this method is a mere mixture of sodium carbonate and hydrosulfite, the hydrosulfite is still unstable and its purity ever decreases during storage for long periods of time.

We made extensive investigations in an attempt to solve this problem, and found that the problem can be effectively and suitably solved by feeding the stabilizer in the form of a solution, and allowing the stabilizer to precipitate in a slurry containing hydrosulfite crystals thereby to coat the surfaces of the hydrosulfite crystals.

The present invention has been accomplished on the basis of these facts.

It is an object of this invention therefore to provide a process for producing stable hydrosulfite.

This object can be achieved by a process for preparing hydrosulfite by reacting formic acid or sodium formate, sodium hydroxide and sulfurous acid anhydride in hydrous methanol, wherein an aqueous solution of sodium carbonate or sodium hydroxide is added as a stabilizer to the slurry obtained by the reaction, and then hydrosulfite is separated from the resulting slurry.

In performing the process of this invention, the production of hydrosulfite by reacting formic acid or sodium formate, sodium hydroxide and sulfurous acid anhydride in hydrous methanol is performed by any method which finally gives a slurry of the hydrosulfite dispersed in hydrous methanol. The hydrosulfite can be prepared by known methods either batchwise or continuously. Anhydrous sodium dithionite of high purity having a large average particle size can be produced continuously in high yields by one of such known methods, which is a process for continuous production of hydrosulfite, comprising reacting formic acid or sodium formate, sodium hydroxide and sulfurous acid anhydride in hydrous methanol using a multi-stage reaction apparatus, wherein all the required amounts of formic acid or sodium formate, sodium hydroxide, methanol and water, and not less than 60%, based on the required amount, of sulfurous acid anhydride are introduced into a first reactor, and the residence time of the materials in the first reactor is adjusted so that the conversion of the introduced sulfurous acid anhydride to hydrosulfite is within the range of 25 to 50%; the remainder of the sulfurous acid anhydride is fed into a second reactor; and the reaction temperature in any given reactor is maintained at a point not lower than that in the immediately preceding reactor (U.S. Pat. application Ser. No. 683,671). When the process of this invention is applied to this manufacturing method, a stabilizer is added continuously to the hydrosulfite-containing slurry obtained continuously, and the stabilized hydrosulfite can be continuously separated from the slurry. Thus, the process of the present invention makes it possible to perform the production and stabilization of hydrosulfite of good quality in a successive manner, and is especially useful in this regard.

In various commercial processes for producing hydrosulfite, the composition of hydrous methanol is naturally limited in many cases because of the need to inhibit the formation of by-products, and maintain the yield of hydrosulfite. Generally, the hydrous methanol in the slurry after the reaction is an aqueous solution containing 60 to 80% by weight of methanol.

When sodium carbonate as an aqueous solution is added to the slurry obtained by the reaction, it immediately precipitates because the hydrous methanol in the slurry is an aqueous solution containing 60 to 80% by weight of methanol. The precipitated sodium carbonate adheres uniformly to the crystals of hydrosulfite in the slurry, and therefore, a marked stabilizing effect can be obtained by adding a small amount of sodium carbonate.

Furthermore, since the reaction of formic acid or sodium formate, sodium hydroxide and sulfurous acid anhydride to produce hydrosulfite proceeds under an elevated pressure induced by the by-product carbon dioxide gas, and the reaction mixture contains carbon dioxide gas dissolved therein, hydrosulfite can be stabilized also by adding an aqueous solution of sodium hydroxide instead of sodium carbonate to the reaction mixture thereby to form sodium carbonate and simultaneously allow it to adhere to the hydrosulfite crystals.

The amount of the stabilizer to be added is 2 to 5%, preferably 2 to 3%, by weight as anhydrous sodium carbonate based on the weight of hydrosulfite in the slurry. The concentration of the stabilizer in the aqueous solution is preferably 10 to 30% by weight for sodium carbonate, and 20 to 50% by weight for sodium hydroxide.

The temperature at which the stabilizer is added to the slurry and the time required for the addition are not limited in particular, but the addition can be effected at room temperature (15° C.) to 80° C. for 0.5 to 4 hours. Carbon dioxide gas reacts with sodium carbonate to produce sodium bicarbonate which has a small stabilizing effect. When sodium carbonate is used as a stabilizer, therefore, it is desirable to add it to a slurry which does not contain carbon dioxide gas dissolved therein. In order to achieve this, it is preferred to purge the carbon dioxide gas dissolved in the slurry at atmospheric pressure after the reaction of forming hydrosulfite, and then add an aqueous solution of sodium carbonate to the slurry.

The simplest and most efficient method comprises continuously feeding the slurry obtained in the final reaction tank during the continuous manufacture of hydrosulfite by the above-mentioned process to a stabilizer-adding tank maintained at atmospheric pressure, purging the carbon dioxide gas at atmospheric pressure, and continuously adding an aqueous solution of sodium carbonate to the slurry. For operational convenience, the temperature of the stabilizer adding tank and the residence time are preferably adjusted to 50°–60° C., and less than 1 hour, respectively.

When sodium hydroxide is used, carbon dioxide gas needs to be dissolved in the slurry. Accordingly, after the reaction at an elevated pressure of up to 5 $Kg/cm^2$ gauge, an aqueous solution of sodium hydroxide needs to be added while maintaining the elevated pressure condition. If the amount of the dissolved carbon dioxide gas is large, sodium carbonate further reacts with the carbon dioxide to form sodium bicarbonate. Sodium bicarbonate is less effective as a stabilizer for hydrosulfite than sodium carbonate. On the other hand, where the carbon dioxide gas is deficient, the sodium hydroxide added reacts with sodium pyrosulfite or acidic sodium sulfite present in the slurry to form sodium sulfite which precipitates as crystals. This tends to reduce the purity of the hydrosulfite crystals.

After adding an aqueous solution of the stabilizer to the slurry, stabilized hydrosulfite is separated from the slurry by separating means such as filtration or centrifugal separation.

As a result of adding the stabilizer in this way, the process can be performed continuously by the present invention by a very simple apparatus. Furthermore, since the stabilizer covers the surface of the hydrosulfite crystals with good efficiency, the amount of the stabilizer can be small, and moreover, hydrosulfite stable over long periods of time can be produced. In the conventional process involving adding sodium carbonate powder to hydrosulfite crystals, the steps of separating and drying hydrosulfite crystals before addition of the stabilizer are essential. But the present invention does not require these steps, and therefore, the hydrosulfite crystals are not likely to decompose during the separating and drying procedures and lend themselves to very easy handling.

The following Examples specifically illustrate the present invention. In these Examples, all percentages are by weight.

EXAMPLE 1

Three 2-liter reactors equipped with a jacket and a reflux condenser using ice water were set up in series.

A 54.4% aqueous solution of sodium formate, a solution consisting of 6.2% of sodium hydroxide, 6.2% of water and 87.6% of methanol, and sulfurous acid anhydride were continuously fed into a first reactor at a rate of 124 g/hour, 421 g/hour, and 78 g/hour, respectively, and with stirring reacted at a temperature of 75° C. and a pressure of 1.0 Kg/cm$^2$ with a residence time of 0.75 hour. The pH of the reaction mixture at this time was 5.1 ± 0.1, and the conversion of sulfurous acid anhydride to hydrosulfite was 35.0%.

While maintaining the above residence time, the resulting slurry was continuously withdrawn from the first reactor, and fed continuously into a second reactor. Separately, sulfurous acid anhydride was introduced into the second reactor at a rate of 9 g/hour. The slurry was reacted at 78° C. with a residence time of 0.75 hour. The pH of the reaction mixture at this time was 5.1 ± 0.1 as in the first reactor. The conversion to hydrosulfite in the second reactor was 52.5%.

The slurry that left the second reactor was fed continuously into a third (final) reactor, and aged at 83° C. for 2 hours. After the aging, the slurry was continuously withdrawn, and introduced into a stabilizer adding tank maintained at 60° C. and atmospheric pressure into which a 25% aqueous solution of sodium carbonate was introduced at a rate of 12 g/hour, and after a residence time of 0.5 hour, continuously withdrawn. The crystals were collected by filtration from the slurry so withdrawn, and the crystals were washed with 3 to 4 times their weight of methanol, and dried to afford hydrosulfite having a purity of 88.7% continuously at a rate of 99.0 g/hour.

EXAMPLE 2

A 58% aqueous solution of sodium formate, a mixture consisting of 14 parts by weight of a 48% aqueous solution of sodium hydroxide and 100 parts by weight of methanol, and sulfurous acid anhydride were fed continuously into a first reactor at 78° C. and 1 Kg/cm$^2$.G at a rate of 140 g/hour, 420 g/hour, and 88 g/hour, respectively, and reacted for 2.5 hours. The reaction mixture was continuously withdrawn from the first reactor, and fed into a second reactor at 83° C. and 1 Kg/cm$^2$.G. After a residence time of 2 hours, the slurry containing hydrosulfite crystals was continuously withdrawn. Then, in a stabilizer-adding tank, a 48% aqueous solution of sodium hydroxide was continuously added to the slurry at 1 Kg/cm$^2$.G and 50° C. with a residence time of 30 minutes so that the amount of the aqueous sodium hydroxide solution became 4.7% (3% calculated as solid sodium carbonate) based on the crystals in the slurry.

The hydrosulfite in the crystals obtained by filtration and drying had a purity of 87.6%. The pH of the slurry was 6.5, and the concentration of sodium thiosulfate was 1.1%.

EXAMPLE 3

The stability with time of hydrosulfite obtained in Examples 1 and 2 was measured.

As comparisons, mixtures of the hydrosulfite powder having a purity of 91% with 5% (Comparative Example 1) and 7% (Comparative Example 2) of sodium carbonate powder were used.

Each specimen was placed in a 100 ml. broad-mouthed bottle in a volume of about 70% of the total capacity of the bottle, and tightly sealed. The bottle was opened indoors once a day, and the contents were fully mixed. The purity of the hydrosulfite in the specimen was measured at the end of 10 days and 20 days, respectively. The results are tabulated below. The figures in the parentheses show the percentage of the purity of each specimen based on the purity of the specimen before testing.

| Specimen | Days that elapsed | | |
|---|---|---|---|
| | 0 | 10 | 20 |
| Example 1 | 88.7 (100) | 87.4 (98.5) | 86.5 (97.5) |
| Example 2 | 87.6 (100) | 86.2 (98.4) | 85.1 (97.1) |
| Comparative Example 1 | 87.0 (100) | 82.6 (94.9) | 78.3 (90.0) |
| Comparative Example 2 | 85.5 (100) | 82.1 (96.0) | 79.0 (92.4) |

It is clear from the above table that the products in accordance with the process of this invention exhibit superior stability to the products obtained by the conventional technique.

What we claim is:

1. A process of preparing stable anhydrous sodium dithionite by adding sodium carbonate to anhydrous sodium dithionite, which comprises adding at 15° to 80° C. an aqueous solution of sodium carbonate to a slurry of anhydrous sodium dithionite crystals dispersed in hydrous methanol containing 60 to 80% by weight of methanol which slurry has been obtained by reacting formic acid or sodium formate, sodium hydroxide, and sulfurous acid anhydride in hydrous methanol, the amount of sodium carbonate added being 2 to 5% by weight based on anhydrous sodium dithionite in said slurry, thereby causing sodium carbonate to precipitate in said slurry and adhere uniformly to anhydrous sodium dithionite crystals; and then separating from said slurry anhydrous sodium dithionite crystals having sodium carbonate adhered thereto.

2. The process of claim 1 wherein said aqueous solution of sodium carbonate contains 10 to 30% by weight of sodium carbonate and and wherein said aqueous solution is added over the course of 0.5 to 4 hours to said slurry of anhydrous sodium dithionite crystals.

3. The process of claim 1 wherein a slurry containing anhydrous sodium dithionite of large average particle size is continuously prepared using a multi-stage reaction apparatus containing at least two reactors by introducing into a first reactor a reaction mixture comprising all the formic acid or sodium formate, sodium hydroxide, methanol and water used to effect the production of anhydrous sodium dithionite, and not less than 60% by weight of the amount of sulfurous acid anhydride that is required to react with said formic acid or sodium formate, and sodium hydroxide in hydrous methanol that are added to the first reactor; adjusting the residence time of the materials in the first reactor so that the conversion of the introduced sulfurous acid anhydride to hydrosulfite is within the range of 25 to 50%; introducing the reaction mixture, at the end of said residence time, and the remaining less than 40% by weight of sulfurous acid anhydride that is required to react with said formic acid or sodium formate, and sodium hydroxide in hydrous methanol that are added to the first reactor, into a second reactor; and maintaining the reaction temperature in each reactor at a point not lower than that in the immediately preceding reactor, and wherein sodium carbonate in an amount of 2 to 5% by weight based on the weight of anhydrous sodium dithionite in said slurry is continuously added to said slurry at 15° to 80° C. in the form of an aqueous solution containing 10 to 30% by weight of sodium carbonate, thereby causing sodium carbonate to precipitate in said slurry and adhere uniformly to said anhydrous sodium dithionite crystals; and thereafter anhydrous sodium dithionite having sodium carbonate adhered thereto and having a large average particle size is continuously separated from the slurry.

4. A process of preparing stable anhydrous sodium dithionite, which comprises adding, at 15° to 80° C., under pressure sufficient to provide enough carbondioxide in solution to prevent formation of sodium sulfite, an aqueous solution of sodium hydroxide to a slurry having anhydrous sodium dithionite crystals dispersed and carbon dioxide dissolved in hydrous methanol containing 60 to 80% by weight of methanol, which slurry has been obtained by reacting under pressure up to 5 Kg/cm$^2$ gauge formic acid or sodium formate, sodium hydroxide, and sulfurous acid anhydride in hydrous methanol, the amount of said sodium hydroxide added corresponding to 2 to 5% by weight, calculated as anhydrous sodium carbonate, based on the weight of anhydrous sodium dithionite in said slurry, thereby causing sodium carbonate to precipitate in said slurry and adhere uniformly to anhydrous sodium dithionite crystals; and then separating from said slurry anhydrous sodium dithionite crystals having sodium carbonate adhered thereto.

5. The process of claim 4 wherein said aqueous solution of sodium hydroxide contains 20 to 50% by weight of sodium hydroxide said slurry having been obtained by reacting formic acid or sodium formate, sodium hydroxide, and sulfurous acid anhydride in hydrous methanol at a pressure of up to 5 kg/cm$^2$ gauge, and wherein said aqueous solution is added over the course of 0.5 to 4 hours to said slurry.

6. The process of claim 4 wherein a slurry containing anhydrous sodium dithionite of large average particle size is continuously prepared at an elevated pressure of up to 5 kg/cm$^2$ gauge using a multi-stage reaction apparatus containing at least two reactors by introuing into a first reactor a reaction mixture comprising all the formic acid or sodium formate, sodium hydroxide, methanol and water used to effect the production of anhydrous sodium dithionite, and not less than 60% by weight of the amount of sulfurous acid anhydride that is required to react with said formic acid or sodium formate, and sodium hydroxide in hydrous methanol that are added to the first reactor; adjusting the residence time of the materials in the first reactor so that the conversion of the introduced sulfurous acid anhydride to hydrosulfite is within the range of 25 to 50%; introducing the reaction mixture, at the end of said residence time, and the remaining less than 40% by weight of sulfurous acid anhydride that is required to react with said formic acid or sodium formate, and sodium hydroxide in hydrous methanol that are added to the first reactor, into a second reactor; and maintaining the reaction temperature in each reactor at a point not lower than that in the immediately preceding reactor, and wherein sodium hydroxide in an amount corresponding to 2 to 5% by weight, calculated as anhydrous sodium carbonate, based on anhydrous sodium dithionite is continuously added to said slurry as an aqueous solution containing 20 to 50% by weight of sodium hydroxide to said slurry under pressure sufficient to provide enough carbon dioxide in solution to prevent formation of sodium sulfite and at 15° C. to 80° C., thereby causing sodium carbonate to precipitate in said slurry and adhere uniformly to said anhydrous sodium dithionite crystals; and thereafter anhydrous sodium dithionite having sodium carbonate adhered thereto and having a large average particle size is continuously separated from the slurry.

* * * * *